UNITED STATES PATENT OFFICE 2,468,181

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application March 11, 1948, Serial No. 14,396

9 Claims. (Cl. 252—341)

This invention relates to processes or procedures for preventing, breaking, or resolving emulsions of the water-in-oil type, and has for its main object to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Still another object of our invention is to provide an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts from pipeline oil.

Demulsification, as contemplated in the present application, includes the preventive step of commingling the demulsifier with the aqueous component which would or might subsequently become either phase of the emulsion, in absence of such precautionary measure. Similarly, such demulsifier may be mixed with the hydrocarbon component.

The material, compound, product, or composition of matter that is used as the demulsifying agent of our process, consists of a cation-active polychloride. Such cation-active polychlorides are obtained by reaction between an esterified polyamino ether, as subsequently described, and diglycol chloroformate sometimes referred to as diethylene glycol bis(chloroformate), the formula for such compound being as follows:

$$\begin{array}{c} CH_2CH_2-O-CO-Cl \\ O \\ CH_2CH_2-O-CO-Cl \end{array}$$

It is well known that triethanolamine can be esterified with higher fatty acids having 8 to 22 carbon atoms, for example, such as lauric acid, stearic acid, oleic acid, and the like, so as to yield a compound of the formula:

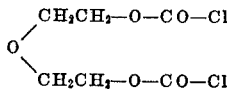

If such compound is heated to a temperature of approximately 175° to 225° C., for 4 to 6 hours, etherification takes place and an acylated polyamino ether is formed. Such reaction may be indicated by the following formula:

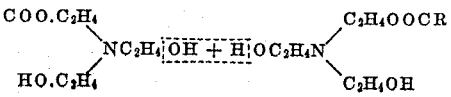

If one gram mole of an esterified triethanolamine, derived, for example, from one mole of oleic acid and one mole of triethanolamine, is heated with one mole of glycerol, there will be formed not only the ether type material described immediately preceding and possibly some polyglycerols, but additionally a compound in the manner indicated as follows:

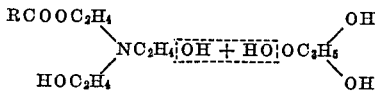

The manufacture of an esterified triethanolamine and etherified polyamines derived from triethanolamine is well known. It is common to employ the fatty acid glyceride, rather than the fatty acid portion, as a matter of economy; thus stearin, olein, or laurin may be employed or preferably naturally-occurring animal or vegetable oils which represent mixed glycerides, such as cottonseed oil, corn oil, peanut oil, neat's-foot oil, lard oil, castor oil, and the like. Such reactions may be referred to as an esterification reaction, or, more specifically, as an alcoholysis reaction. If the glyceride is employed, then, of course, glycerol is liberated and enters into the reactions previously indicated, i. e., the formation of a polyglycerol or the formation of an ether in which the glycerol residue appears.

One can react dichloroethylether with 2 moles of ammonia and treat the resultant diamine with 4 moles of ethylene oxide so as to yield an amino ether alcohol of the following structure:

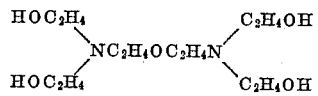

Similarly, triethanolamine can be heated so as to undergo an etherification reaction to yield the same product. Likewise, 3 moles of triethanolamine can be etherified or heat-polymerized, to yield a product of the following composition:

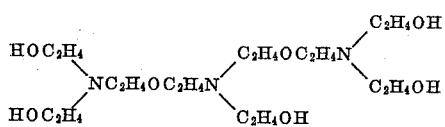

Such polymerized triethanolamines have been described in the literature and are well known products.

If one mole of a glyceride is reacted with 6 or more moles of triethanolamine at a temperature between 175° and 225° C., so as to permit the completion of alcoholysis and etherification, then and in that event, one obtains an acylated polyamino ether in which the acyl radical is that of the parent glyceride and the aminoether radical represents the residue of the two reactants. The manufacture of such compounds is well known, and the products are used for various purposes. We prefer to use the conventional procedure for forming such acylated polyaminoethers by using triethanolamine as the raw material and employing a single step, rather than employing a two-step process in which triethanolamine is first polymerized and then subjected to acylation.

The expression "higher molecular weight carboxy acids" is an expression frequently employed to refer to certain organic acids, particularly monocarboxy acids, having more than 6 carbon atoms and generally less than 40 carbon atoms. The commonest examples include the detergent-forming acids, i. e., those acids which combine with alkalies to produce soap or soap-like bodies. The detergent-forming acids, in turn, include naturally-occurring fatty acids, resin acids, such as abietic acid, naturally-occurring petroleum acids such as naphthenic acids, and carboxy acids produced by the oxidation of petroleum. As will be subsequently indicated, there are other acids which have somewhat similar characteristics and are derived from somewhat different sources, and are different in structure, but can be included in the broad generic term previously indicated.

Among sources of such acids may be mentioned straight chain and branched chain, saturated and unsaturated, carboxylic, aliphatic, alicyclic, fatty, aromatic, hydroaromatic, and aralkyl acids, including caprylic acid, butyric acid, heptylic acid, caproic acid, capric acid, pimelic acid, sebacic acid, erucic acid, saturated and unsaturated higher molecular weight aliphatic acids, such as the higher fatty acids containing at least 8 carbon atoms, and including in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetylricinoleic acid, linoleic acid, linolenic acid, lauric acid, myristic acid, undecylenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil and other fish oils, teaseed oil, partially or completely hydrogenated animal and vegetable oils, such as these mentioned; hydroxy and alphahydroxy higher carboxylic, aliphatic and fatty acids, such as hydroxystearic acid, dihydroxypalmitic acid, dihydroxystearic acid, dihydroxybehenic acid, alphahydroxy capric acid, alphahydroxy stearic acid, alphahydroxy palmitic acid, alphahydroxy lauric acid, alphahydroxy myristic acid, alphahydroxy cocoanut oil mixed fatty acids, alphahydroxy margaric acid, alphahydroxy arachidic acid, and the like; fatty and similar acids derived from various waxes, such as beeswax, spermaceti, montan wax, Japan wax, coccerin, and carnauba wax. Such acids include carnaubic acid, cerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroaromatic acids, such as hexahydrobenzoic acid, hydrogenated naphthoic, hydrogenated carboxydiphenyl, naphthenic, and abietic acid; aralkyl and aromatic acids, such as hexahydrobenzoic acid, hydrogenated naphthoic, hydrogenated polycarboxy-diphenyl, naphthenic, and abietic acid; aralkyl and aromatic acids, such as benzoic acid, Twitchell fatty acids, naphthoic acid, carboxy-diphenyl pyridine carboxylic acid, hydroxybenzoic acid, and the like.

Other suitable acids include phenylstearic acid, benzoylnonylic acid, campholic acid, fencholic, cetyloxybutyric acid, cetyloxyacetic acid, etc.

Another source of suitable acids are those commonly referred to as lac acids, such as, for example, as the acids derived from shellac. Such acids include various polyhydroxy acids, for example, aleuritic acid, shelloic acid, and keroolic acid.

As is well known, one may use substituted acids in which some other non-functional constituent enters the structure of the fatty acid. For instance, one may use aryl-, hydroxy-, alkoxy-, keto, and amino-derivatives. Generally speaking, however, it is always preferable to use the unsubstituted acid, particularly free from substituents which contain either oxygen or nitrogen atoms. Generally speaking, the introduction of hydrocarbon radicals, regardless of source, has little effect except in altering the hydrophile-hydrophobe balance.

One may also employ the blown or oxidized acids, such as blown ricinoleic acid, blown oleic, etc., or estolides derived from blown oils, such as blown caster oil, blown soyabean oil, etc.

Briefly stated, acylated polyamino ethers of the kind herein employed as a raw material for combination with diglycol chloroformate, are prepared in the customary manner by using either the high molal monocarboxy acid or the corresponding glycerol and triethanolamine of commercial grade, actually, the reactions are somewhat more complicated, for a number of reasons, as indicated by what has been said previously, two of which reasons are as follows: Commercial triethanolamine contains approximately 85% of triethanolamine, 12% of diethanolamine, and 3% of monoethanolamine. There is some indication that a dehydration reaction may take place in the manner suggested, by the following reaction:

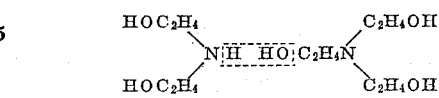

Such reaction, for example, would yield at least a diamine which does not contain an ether linkage.

The other reaction appears to be a dehydration reaction involving the formulation of a vinyl derivative which presumably polymerizes immediately. The nature of the polymer formed is not known and the following illustration as to the polymerization reaction is merely speculation:

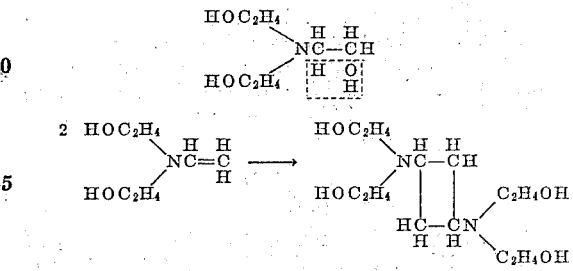

The likelihood of this reaction taking place is indicated by the fact that when a suitable reaction mixture, for instance, one mole of a glyceride such as castor oil or soyabean oil, is heated with 7 to 10 moles of triethanolamine until reaction is complete, as indicated by the fact that no more triethanolamine can be distilled out when subjected to distillation under vacuum, one finds that the water eliminated during the course of the reaction is considerably in excess of theoretical, based on etherification alone, for instance, as much as 50% to 75% in excess, and that the molecular weight is correspondingly somewhat less than one would anticipate if the theoretical amount of water were eliminated and ether linkages only were formed.

The fact that such reactions between triethanolamine, particularly commercial triethanolamine, and a higher fatty acid glyceride or a similar reactant, are of a complex nature, is suggested further by the fact that the water eliminated invariably is accompanied by a small proportion of a low volatile amine which results from the pyrolysis of the triethanolamine or the monoethanolamine, or diethanolamine, the two latter being present to a very minor degree. The use of purified triethanolamine greatly decreases the formation of such volatile amines, and thus, suggests that they may appear, due to the presence of monoethanolamine or diethanolamine in commercial triethanolamine. In any event, the reaction is conducted commercially at a temperature of approximately 150° to 240° C., using constant stirring and a reaction period of 4 to 10 hours, with the proper apparatus, so that the water resulting from reaction can be condensed and measured. The completion of the reaction is indicated by two simple tests; subjecting a sample of the reaction mass to distillation under vacuum, so as to eliminate any uncombined triethanolamine, and also by merely measuring the molecular weight of the acylated product. Such procedures for examination have been described in the literature and require no further consideration here. They are noted, briefly for the reason that the products herein specified are described in the method of manufacture, rather than attempt to employ formulae. This appears logical, for the reason that the chemical structures are only partially known and not satisfactory for indicating the exact nature of the final cogeneric reaction mass.

The acylated polyamino ether must be susceptible to reaction with diglycol chloroformate. It has been pointed out previously that there may be present a reactive amino hydrogen atom as a residue from monoethanolamine or diethanolamine which appears in significant proportions in commercial triethanolamine. There is no reason, however, that one should not use technically pure triethanolamine, if available. Thus, no reliance can be placed on the presence of such amino hydrogen atom from the point of reactivity. This means that the point of reaction involves an alcoholic hydroxyl radical which remains in the polyamino residue after acylation, or if the polyaminoether contained only one hydroxyl radical per molecule, and if such radical were involved in the acylation reaction, then and in that event, the source of the alcoholic hydroxyl radical would have to be the acyl radical derived from the ricinoleic acid, hydroxystearic acid, or the like. Obviously, however, both the acyl radical and the polyamino ether residue can carry a hydroxyl radical. The hydroxyl value of the polyamino ether can be determined by the same methods employed for determining the hydroxyl value of commercial diethanolamine, triethanolamine, or similar amino alcohols.

Recapitulating what has been said, one may characterize the reactant which combines with diglycol chloroformate as a hydroxylated acylated polyaminoether obtained by a condensation reaction between a member of the class consisting of high molal monocarboxy acids and their glycerides in combination with triethanolamine, the ratio of reactants being such that there are at least 2 and not over 4 moles of triethanolamine for each fatty acid radical; the acyl radical of said acid having at least 8 carbon atoms; said acylated polyaminoethers being obtained by acylation, dehydration, and etherification reactions conducted within the temperature range of 150° to 240° C. for a period of time sufficient to eliminate all uncombined triethanolamine, and yield a product corresponding in molecular weight to the corresponding hydroxylated acylated polymeric triethanolamine condensate. Where the acylated polyamino ether has more than one reactive hydrogen atom, obviously such reactant can be combined, mole for mole, with diglycol chloroformate. It is our preference, however, to employ 2 moles of the acylated polyamino ether and one mole of the diglycol chloroformate.

ACYLATED POLYAMINO ETHER

*Example 1*

One gram mole of castor oil (932 grams) was mixed with 6 gram moles of commercial triethanolamine (846 grams) based on a molecular weight of 140.9. Such mixture was heated to approximately 210° to 225° C. for 3 hours, with constant stirring. The volatile products of reaction were condensed and showed approximately 72 grams. At the end of this period of time, the average molecular weight was approximately 600. When the product so prepared was subjected to vacuum distillation under conditions which would permit uncombined triethanolamine to distill over, there was no appreciable distillate. Such manufacturing procedure is strictly conventional, and we have employed it on a large scale in commercial manufacture, using substantially the same directions as appear herein.

ACYLATED POLYAMINO ETHER

*Example 2*

The same procedure was employed as in the preceding example, except that 9 gram moles of triethanolamine (1270 grams) were employed instead of 6 gram moles. The time required for the reaction was slightly longer than in Example 1, requiring about 3¼ hours.

ACYLATED POLYAMINO ETHER

*Example 3*

The same procedure was followed as in Example 1, preceding, except that 12 gram moles of trimethanolamine (1690 grams) were employed instead of 6 gram moles. The time required for completion of reaction is somewhat longer, being about 4 hours.

ACYLATED POLYAMINO ETHER

*Example 4*

The same procedure was followed as in the preceding example, but soyabean oil was employed instead of castor oil. The weight of a gram mole of soyabean oil is considered as being 914 grams. The three variants illustrated by preceding Examples 1, 2 and 3 were prepared in the same manner, using the same temperature and the same reaction time.

ACYLATED POLYAMINO ETHER
Example 5

The same procedure was followed as in the preceding example, but neat's-foot oil was employed instead of castor oil. The weight of a gram mole of neat's-foot oil is considered as being 895 grams. The three variants illustrated by preceding Examples 1, 2 and 3 were prepared in the same manner, using the same temperature and the same reaction time.

ACYLATED POLYAMINO ETHER
Example 6

The same procedure was followed as in Examples 1, 2 and 3, preceding, except that 3 gram moles of oleic acid (846 grams) were substituted for the castor oil employed in Examples 1, 2 and 3. Otherwise, the same procedure was followed. It should be noted that there is a difference in the following respects, to wit, that a salt first forms which then is converted into the ester, and secondly, there is no glycerine liberated as when a glyceride is employed, and finally, there is one mole additional water formed, due to the esterification reaction, as differentiated from an alcoholysis reaction.

ACYLATED POLYAMINO ETHER
Example 7

The same procedure was followed as in Examples 1, 2 and 3, preceding, except that 3 gram moles of soyabean oil fatty acids (876 grams) were substituted for the castor oil employed in Examples 1, 2 and 3. Otherwise, the same procedure was followed.

ACYLATED POLYAMINO ETHER
Example 8

The same procedure was followed as in Examples 1, 2 and 3, preceding, except that 3 gram moles of abietic acid (907.3 grams) were substituted for the castor oil employed in Examples 1, 2 and 3. Otherwise, the same procedure was followed.

Having obtained an acylated polyamino ether of the kind specified by using the procedure immediately following, or by the use of any conventional procedure, one merely reacts such amine reactant with diglycol chloroformate. The most advantageous ratio is to employ one mole of diglycol chloroformate for each two moles of the acylated polyamino ethers of the kind previously described. The following examples will illustrate such reaction or reactions.

CATION-ACTIVE POLYCHLORIDE
Example 1

An acylated aminoether such as described under the heading "Acylated Polyaminoether, Example 1" was reacted with diglycol chloroformate in the ratio of 2 gram moles to one gram mole, the quantities employed being 300 grams of the acylated aminoether and 57.75 grams of the diglycol chloroformate. The mixture was placed in flask with a suitable stirrer and reflux condenser and heated at 160° to 180° C. for one hour. The mixture foamed vigorously when first warmed, but as soon as reaction started the foaming apparently decreased. The particular acylated polyamino ether employed gave a cloudy solution in water. Diglycol chloroformate is, of course, water-insoluble. The resultant product at the end of the reaction period was soluble in water to give a perfectly clear solution and showed the presence of chloride ions.

CATION-ACTIVE POLYCHLORIDE
Example 2

The same procedure was followed, except that the acylated polyamino ether described under the heading "Acylated Polyamino Ether, Example 2" was employed instead of the particular one described in the corresponding example. In other words, the only difference in the two procedures was that instead of using 300 grams, as in Example 1, there were used instead 450 grams.

CATION-ACTIVE POLYCHLORIDE
Example 3

The same procedure was followed, except that the acylated polyamino ether described under the heading "Acylated Polyamino Ether, Example 3" was employed instead of the particular one described in the corresponding example. In other words, the only difference in the two procedures was that instead of using 300 grams, as in Example 1, there were used instead 600 grams.

CATION-ACTIVE POLYCHLORIDE
Example 4

The same procedure was followed to give three compounds, but the acylated aminoether employed was that described under the heading "Acylated Polyamino Ether, Example 4." In essence, this was simply the same product in which castor oil was replaced by soyabean oil.

CATION-ACTIVE POLYCHLORIDE
Example 5

The same procedure was followed to give three compounds, but the acylated aminoether employed was that described under the heading "Acylated Polyamino Ether, Example 6."

CATION-ACTIVE POLYCHLORIDE
Example 6

In light of the reactions described previously and the variety of high molal acids employed, it is to be noted that a number of variations are obviously available without experimentation. It has been previously pointed out that the nature of the acylated polyamino ether cannot be determined exactly. Complexity of the structure is multiplied, even further, after reaction with the chloroformate. The reason, of course, is obvious. Since the acylated aminoether is apt to have, and almost invariably does have, a plurality of ethanol radicals, obviously one mole of a properly selected acylated polyamino ether can react with one mole of diglycol chloroformate. It is advantageous, however, to use the 2 to 1 molar ratio previously described. In such instances where castor oil or ricinoleic acid, hydroxystearic acid, or the equivalent glyceride, is employed, the reaction involving diglycol chloroformate, may react at such alcoholic hydroxyl radical. Similarly, diethanolamine as present in significant amounts in commercial triethanolamine, as previously described, might enter into etherification reaction, as indicated in the following manner:

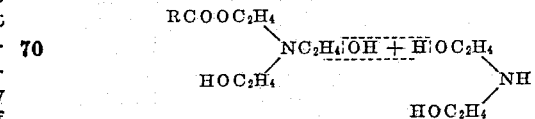

with the result that there is present an acylated polyamino ether having a reactive aminohydrogen atom. If such happens to be the case, needless to say, diglycol chloroformate could react with such radical to form an amido linkage, as differentiated from an ether linkage. In light of what has been said immediately preceding, it is obvious that the final product herein disclosed and employed as a demulsifier, is best described in terms of method of manufacture.

Conventional demulsifying agents employed in the treatment of oil field emulsions are used as such, or after dilution with any suitable solvent, such as water; petroleum hydrocarbons, such as gasoline, kerosene, stove oil; a coal tar product such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process for resolving emulsions, may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000 or 1 to 20,000, or even 1 to 30,000, or even 1 to 40,000, or 1 to 50,000 in desalting practice, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidedly feasible when the demulsifier is used in connection with acidification of calcareous oil-bearing strata, especially if suspended in or dissolved in the acid employed for acidification.

A somewhat analogous use of our demulsifying agent is in the removal of a residual mud sheath which remains after drilling a well by the rotary method. Sometimes the drilling mud contains added calcium carbonate, or the like, to render the mud susceptible to reaction with hydrochloric acid, or the like, and thus expedite its removal.

Having thus described our invention, what we claim as new and desire to secure by Letters Patent is:

1. A process for breaking petroleum emulsions of the water-in-oil type, characterized by subjecting the emulsion to the action of a demulsifier including a cation-active polychloride, said cation-active polychloride being the reaction product of diglycol chloroformate and a hydroxylated acylated polyaminoether obtained by a condensation reaction between a member of the class consisting of high molal monocarboxy acids and their glycerides in combination with triethanolamine, the ratio of reactants being such that there are at least 2 and not over 4 moles of triethanolamine for each fatty acid radical; the acyl radical of said acid having at least 8 carbon atoms; said acylated polyaminoethers being obtained by acylation, dehydration and etherification reactions conducted within the temperature range of 150° to 240° C. for a period of time sufficient to eliminate all uncombined triethanolamine, and yield a product corresponding in molecular weight to the corresponding hydroxylated acylated polymeric triethanolamine condensate.

2. The process of claim 1, wherein the acyl radical is that of a monocarboxy acid having not over 22 carbon atoms and containing the elements carbon, hydrogen and oxygen only.

3. The process of claim 1, wherein the acyl radical is that of a higher fatty acid having not over 22 carbon atoms.

4. The process of claim 1, wherein the acyl radical is that of a higher fatty acid having not over 18 carbon atoms.

5. The process of claim 1, wherein the acyl radical is that of an unsaturated higher fatty acid having not over 18 carbon atoms.

6. The process of claim 1, wherein the acyl radical is that of an unsaturated higher fatty acid having not over 18 carbon atoms and the ratio of amine reactant to diglycol chloroformate is 2:1.

7. The process of claim 1, wherein the demulsifying agent is obtained by reaction between one mole of diglycol chloroformate and two moles of a polyacylated aminoether derived in turn by reaction between one mole of castor oil and 6 moles of commercial triethanolamine.

8. The process of claim 1, wherein the demulsifying agent is obtained by reaction between one mole of diglycol chloroformate and two moles of a polyacylated aminoether derived in turn by reaction between one mole of castor oil and 9 moles of commercial triethanolamine.

9. The process of claim 1, wherein the demulsifying agent is obtained by reaction between one mole of diglycol chloroformate and two moles of a polyacylated aminoether derived in turn by reaction between one mole of castor oil and 12 moles of commercial triethanolamine.

MELVIN DE GROOTE.
BERNHARD KEISER.

REFERENCES CITED

The following references are of record in the file of this patent:

UNITED STATES PATENTS

| Number | Name | Date |
|---|---|---|
| Re. 22,963 | Monson et al. | Jan. 13, 1948 |
| 2,167,349 | De Groote et al. | July 25, 1939 |
| 2,231,754 | De Groote et al. | Feb. 11, 1941 |
| 2,306,329 | De Groote et al. | Dec. 22, 1942 |
| 2,373,174 | De Groote et al. | Apr. 10, 1945 |
| 2,390,078 | De Groote et al. | Dec. 4, 1945 |
| 2,435,478 | Teeter et al. | Feb. 3, 1948 |